US010467285B2

(12) United States Patent
Banvait et al.

(10) Patent No.: US 10,467,285 B2
(45) Date of Patent: Nov. 5, 2019

(54) RADIO-STATION-RECOMMENDATION SYSTEM AND METHOD

(71) Applicant: Ford Global Technologies, LLC, Dearborn, MI (US)

(72) Inventors: Harpreetsingh Banvait, Sunnyvale, CA (US); Casey Bryan Feldman, Sunnyvale, CA (US); Jinesh J. Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/580,194

(22) PCT Filed: Aug. 21, 2015

(86) PCT No.: PCT/US2015/046331
§ 371 (c)(1),
(2) Date: Dec. 6, 2017

(87) PCT Pub. No.: WO2017/034519
PCT Pub. Date: Mar. 2, 2017

(65) Prior Publication Data
US 2018/0165359 A1    Jun. 14, 2018

(51) Int. Cl.
*G06F 16/635* (2019.01)
*G06Q 30/06* (2012.01)
(Continued)

(52) U.S. Cl.
CPC ........... *G06F 16/637* (2019.01); *G06N 20/00* (2019.01); *G06Q 30/0631* (2013.01);
(Continued)

(58) Field of Classification Search
CPC .................................................... G06F 16/637
See application file for complete search history.

(56) References Cited

U.S. PATENT DOCUMENTS 7,171,174 B2   1/2007  Ellis
7,412,202 B2   8/2008  Gutta
(Continued)

FOREIGN PATENT DOCUMENTS

CN         102324993 B    10/2013
WO     WO-2009113040 A2    9/2009

OTHER PUBLICATIONS

Travel Recommendations in a Mobile Tourist Information System, Annika Hinze and Saijai Junmanee, University of Waikato.
Geoshuffle: Location-Aware, Content-Based Music Browsing Using Self-Organizing Tag Clouds, University of Victoria Electrical and Computer Engineering.

*Primary Examiner* — David Bilodeau
(74) *Attorney, Agent, or Firm* — David R. Stevens; Stevens Law Group

(57) ABSTRACT

A method of recommending radio stations including the step of generating a plurality of driver models. Each driver model may correspond to a different driver and documents audio content listened to by that driver while driving. The plurality of driver models may be aggregated to generate a recommendation model correlating radio stations, audio content, and geographic regions. Thereafter, a request for recommendations may be received from a driver while the driver is in a familiar or unfamiliar geographic region. A driver model corresponding to the driver may be compared against other data contained within the recommendation model in order to identify one or more radio stations that present audio content within the geographic region that best matches the audio content documented within the driver model corresponding to the driver. The one or more radio stations may then be communicated to the driver.

19 Claims, 6 Drawing Sheets

(51) Int. Cl.
*H04N 21/25* (2011.01)
*G06N 20/00* (2019.01)
*H04W 4/44* (2018.01)
*H04W 4/029* (2018.01)
*H04W 4/04* (2009.01)
*H04H 60/33* (2008.01)
*H04H 60/46* (2008.01)
*H04H 60/52* (2008.01)
*H04N 21/258* (2011.01)
*H04N 21/2668* (2011.01)
*H04N 21/414* (2011.01)
*H04N 21/466* (2011.01)
*H04N 21/81* (2011.01)

(52) U.S. Cl.
CPC ............ *H04H 60/33* (2013.01); *H04H 60/46* (2013.01); *H04H 60/52* (2013.01); *H04N 21/251* (2013.01); *H04N 21/25841* (2013.01); *H04N 21/2668* (2013.01); *H04N 21/41422* (2013.01); *H04N 21/4668* (2013.01); *H04N 21/8113* (2013.01); *H04W 4/029* (2018.02); *H04W 4/046* (2013.01); *H04W 4/44* (2018.02)

(56) References Cited

U.S. PATENT DOCUMENTS

| | | | | |
|---|---|---|---|---|
| 7,636,557 B2* | 12/2009 | Klunk | ............... | H04H 60/44 455/161.2 |
| 2002/0081984 A1* | 6/2002 | Liu | ............... | H03J 1/0008 455/186.1 |
| 2002/0197976 A1* | 12/2002 | Liu | ............... | B60R 16/037 455/352 |
| 2004/0092253 A1* | 5/2004 | Simonds | ............ | B60R 16/0315 455/414.2 |
| 2006/0258377 A1* | 11/2006 | Economos | ............ | H04L 12/189 455/461 |
| 2010/0178938 A1 | 7/2010 | Ingrassia | | |
| 2011/0040707 A1 | 2/2011 | Theisen | | |
| 2013/0304689 A1 | 11/2013 | Faenger | | |
| 2013/0337838 A1* | 12/2013 | Kolodziej | ............ | H04W 4/023 455/456.3 |
| 2013/0344856 A1* | 12/2013 | Silver | ............... | H04M 1/72577 455/418 |
| 2013/0346234 A1* | 12/2013 | Hendrick | ............ | G06Q 30/0631 705/26.7 |

* cited by examiner

RADIO-STATION-RECOMMENDATION SYSTEM AND METHOD

RELATED APPLICATIONS

This application claims the benefit of PCT Application Serial No. PCT/US2015/046331, filed Aug. 21, 2015, which is hereby incorporated herein by reference in its entirety for all purposes.

BACKGROUND

Field of the Invention

This invention relates to infotainment systems and more particularly to systems and methods for recommending radio stations to a driver when that driver is driving in familiar or unfamiliar geographic regions.

Background of the Invention

When a driver is driving in his or her local area, he or she is familiar with the local radio stations and may have certain favorites. The driver is also likely aware of the time when his or her favorite radio shows are being broadcast. However, when the driver is travelling in a new area, he or she may be required to go through the tedious process of finding a suitable radio station or show. Moreover, should the driver find suitable content in the first few searches, the content may soon end and the driver may again be searching for suitable content. This process may be distracting for the driver. Accordingly, what is needed is a system and method for finding suitable audio content in various geographical regions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
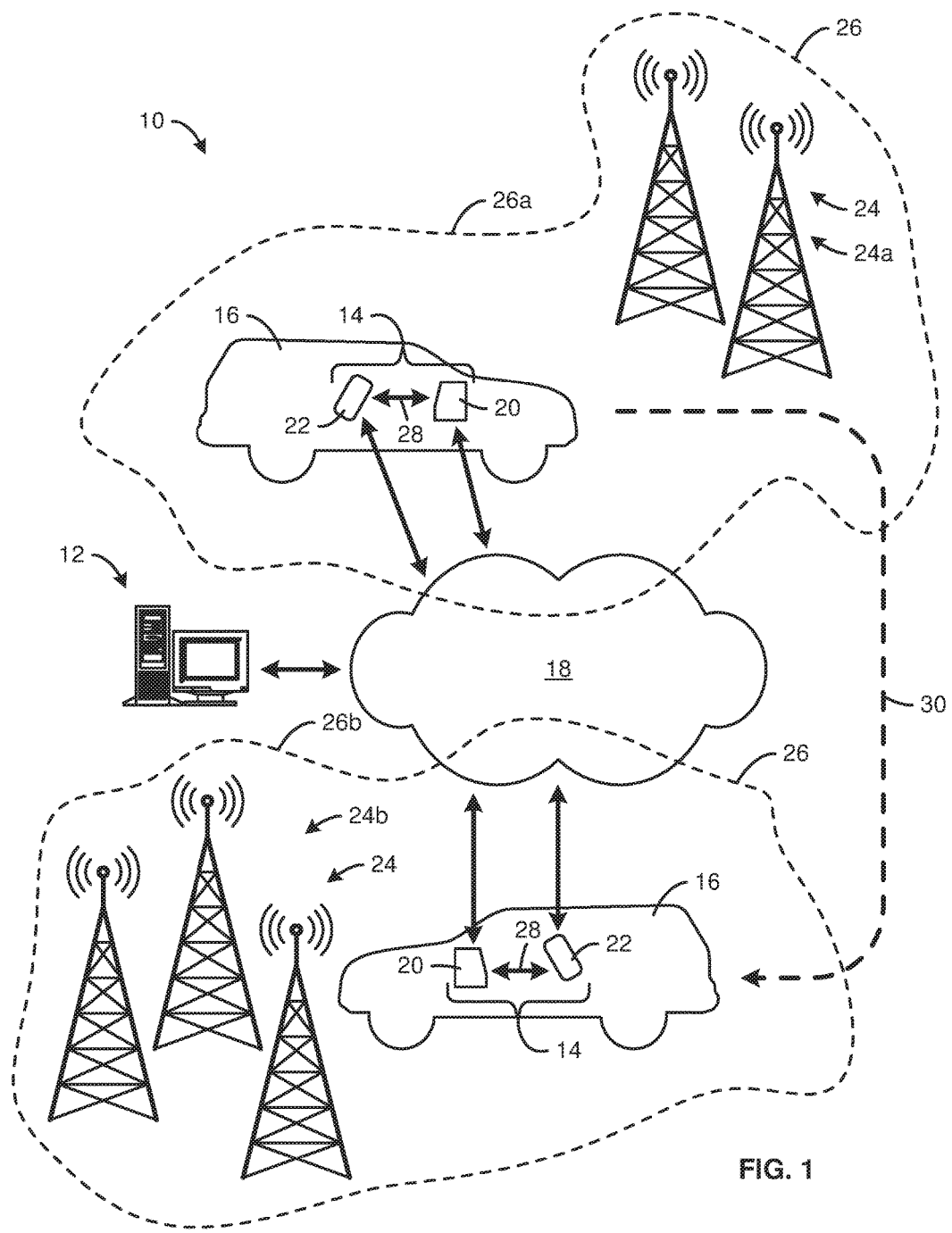
FIG. 1 is a schematic diagram illustrating a recommendation system in accordance with the present invention.

Referring to FIG. 1, a system 10 in accordance with the present invention may provide, enable, or support computer-based, multi-node, radio-station recommendations. A system 10 may do this in any suitable method. For example, a system 10 may be embodied as hardware, software, or some combination thereof.

In certain embodiments, a system 10 may include at least one remote computer 12 and multiple in-vehicle computer systems 14. The in-vehicle computer systems 14 may be distributed across multiple vehicles 16. For example, one in-vehicle computer system 14 may be located within each vehicle 16 of a plurality of vehicles 16. The various in-vehicle computer systems 14 may communicate with the at least one remote computer 12 via a communication network 18.

An in-vehicle computer system 14 may include an infotainment system 20, a mobile device 22, or the like or a combination thereof. An infotainment system 20 may be a system installed into a vehicle 16 to provide audio entertainment, video entertainment, navigation systems, or the like or a combination or sub-combination thereof. In selected embodiments, an infotainment system 20 may comprise computer hardware and computer software. The computer hardware of an infotainment system 20 may include one or more processors, memory, a user interface, one or more antennas, other hardware, or the like or a combination or sub-combination thereof. The memory may be operably connected to the one or more processors and store the computer software. This may enable the one or more processors to execute the computer software.

A user interface of an infotainment system 20 may enable a user to interact with, customize, or control various aspects of the infotainment system 20. In selected embodiments, the user interface of an infotainment system 20 may include one or more buttons, keys, touch screens, pointing devices, or the like or a combination or sub-combination thereof.

In certain embodiments, the one or more antennas of an infotainment system 20 may include an antenna for receiving local (i.e., terrestrial) radio signals, an antenna for receiving satellite radio signals, an antenna for receiving signals from a mobile device 22, an antenna that enables the infotainment system 22 to communicate with at least one remote computer 12 via a communication network 18 (e.g., a cellular network connected to the Internet), an antenna to receive GPS signals from one or more GPS satellites, or the like or a combination or sub-combination thereof.

A mobile device 22 may be a mobile telephone (e.g., a "smart" phone), tablet computer, laptop computer, personal digital assistant, or the like. A mobile device 22 may comprise computer hardware and computer software. Computer hardware of a mobile device 22 may include one or more processors, memory, a user interface, one or more antennas, other hardware, or the like or a combination or sub-combination thereof. The memory may store the computer software and be operably connected to the one or more processors. This may enable the one or more processors to execute the computer software.

A user interface of a mobile device 22 may enable a user to interact with, customize, or control various aspects of the mobile device 22. In selected embodiments, a user interface of a mobile device 22 may include one or more buttons, keys, touch screens, pointing devices, or the like or a combination or sub-combination thereof.

In certain embodiments, one or more antennas of a mobile device 22 may enable the mobile device 22 to receive and/or send signals to other components or sub-systems within a system 10. For example, in selected embodiments, a mobile device 22 may include an antenna enabling the mobile device 20 to communicate with at least one remote computer 12 via a communication network 18, an antenna for receiving signals from and sending signals to an infotainment system 20, or the like or a combination thereof. Alternatively, or in addition thereto, a mobile device 22 may include, an antenna to receive GPS signals from one or more GPS satellites.

While driving in a vehicle 16, a human driver may use an in-vehicle computer system 14 to listen to or "consume" audio content (e.g., music, talk radio, podcasts, or other programming). For example, a driver may listen to audio content delivered to an in-vehicle computer system 14 via radio waves emanating from one or more local radio stations 24 locating within a geographic region 26 in which the driver is driving. Alternatively, a driver may listen to audio content delivered to an in-vehicle computer system 14 via radio waves emanating from one or more satellites. In other embodiments, a driver may listen to audio content read from a computer-readable medium (e.g., compact disc, flash drive, or the like) by an in-vehicle computer system 14. In still other embodiments, a driver may listen to audio content fed to an infotainment system 20 by a mobile device 22.

For example, in selected embodiments, a communication link 28 may be established between a mobile device 22 and an infotainment system 20 of a vehicle 16. In selected embodiments, this communication link 28 may be a wired pairing or wireless pairing (e.g., a wireless pairing employing Ultra High Frequency (UHF) radio waves). Accordingly, audio content may be passed over the communication link 28 from a mobile device 22 to an infotainment system 20.

Data characterizing the audio content listened to by a driver may be passed from an in-vehicle computer system 14 to at least one remote computer 12. For example, data characterizing the audio content listened to by a driver may be passed: (1) from an infotainment system 20, through a communication network 18, to at least one remote computer 12; (2) from a mobile device 22, through a communication link 28, to an infotainment system 20 and then from the infotainment system 20, through a communication network 18, to at least one remote computer 12; (3) from a mobile device 22, through a communication network 18, to at least one remote computer 12; or (4) from an infotainment system 20, through a communication link 28, to a mobile device 22 and then from the mobile device 22, through a communication network 18, to at least one remote computer 12.

By collecting data characterizing the audio content listened to by a driver, a remote computer 12 or set of remote computers 12 may determine and document the preferences of the driver. Additionally, by collecting data characterizing the audio content listened to by a plurality of drivers (e.g., hundreds or thousands of drivers) located in a plurality of geographic regions 26, a remote computer 12 or set of remote computers 12 may learn and document something about what audio content is available in which geographic regions 26, on which radio stations 24, at which times, etc.

A driver may have a geographic region 26 that may be characterized as a base geographic region 26a. A base geographic region 26a of a driver may be a region 26 where the driver spends the most time (e.g., the most time listening to audio content or driving and listening to audio content). In many situations, a driver may be familiar with the radio programming and stations that he or she prefers in his or her base geographic region 26a. However, should a driver travel 30 outside of his or her base geographic region 26a to another geographic region 26b, the driver may not be familiar with the radio programming and stations 24b in that new, unfamiliar geographic region 26b.

Accordingly, when a driver would like to receive one or more recommendations for radio stations 24, he or she may enter a request for recommendations into an in-vehicle computer system 14. The in-vehicle computer system 14 may pass the request on to a remote computer 12. A remote computer 12 may formulate an appropriate response to the request and pass that response back to the in-vehicle computer system 14. In selected embodiments, such a response may identify one or more radio stations 24b located in the new, unfamiliar geographic region 26b that have audio content that best matches the audio content to which the driver usually listens.

Figure 2:
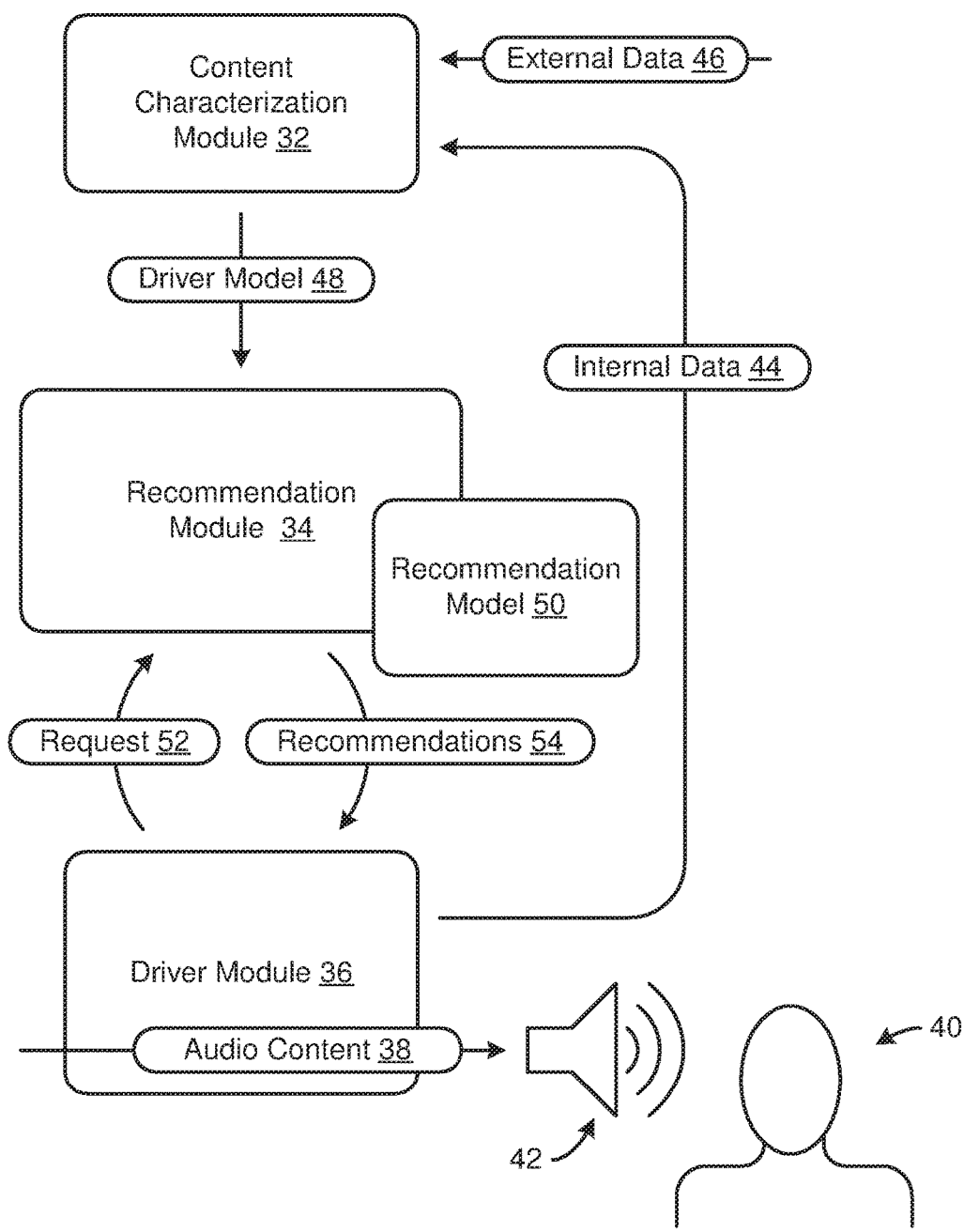
FIG. 2 is a schematic block diagram of one embodiment of software that may be executed by the recommendation system of FIG. 1.

Referring to FIG. 2, a system 10 in accordance with the present invention may run certain software. In selected embodiments, such software may include a content-characterization module 32, a recommendation module 34, and a driver module 36. A content-characterization module 32 may be executed by a remote computer 12, an in-vehicle computer system 14, or some combination thereof. A recommendation module 34 may also be executed by a remote computer 12, an in-vehicle computer system 14, or some combination thereof. In certain embodiments, the same remote computer 12 may execute both a content-characterization module 32 and a recommendation module 34. Alternatively, different remote computers 12 may execute a content-characterization module 32 and a recommendation module 34.

A driver module 36 may be executed by an in-vehicle computer system 14. For example, a driver module 36 may be executed by an infotainment system 22, a mobile device 20, or some combination thereof. In selected embodiments, a driver module 36 may monitor the audio content 38 that is being heard by a driver 40. For example, a driver module 36 may monitor audio content 38 that is played over the speakers 42 of an infotainment system 14. In order to monitor the audio content 38 listened to by multiple drivers 40, a system 10 in accordance with the present invention may support and contain multiple driver modules 36. In certain embodiments, one driver module 36 may correspond to each vehicle 16 of a plurality of vehicles 16.

As it monitors the audio content 38 listened to by a driver 40, a driver module 36 may collect internal data 44 that may be used by a content-characterization module 32 to identify or otherwise characterize the audio content 38. In selected embodiments, such internal data 44 may be passed from a driver module 36 running on an in-vehicle computer system 14 to a content-characterization module 32 running on a remote computer 12.

A content-characterization module 32 may use the internal data 44 collected by a driver module 36 to identify the audio content 38 being listened to by a corresponding driver 40. In selected embodiments or situations, the internal data 44 may be all that is needed to identify the audio content 38. However, in other embodiments or situations, the internal data 44 alone may be insufficient to identify the audio content 38. Accordingly, in such embodiments or situations, a content-characterization module 32 may obtain whatever external data 46 is necessary to make an appropriate identification of the audio content 38.

After identifying the audio content 38 being listened to by a driver 40 over some period of time, a content-characterization module 32 may generate a driver model 48. The driver model 48 may present a summary of the audio content 38 preferred by the driver 40. A content-characterization module 32 may continuously or periodically update a driver model 48 so that it presents an accurate and current view of the preferences of a corresponding driver 40.

A recommendation module 34 may aggregate multiple driver models 48 to form a recommendation model 50. A recommendation model 50 may identify which drivers 40 listened to which radio stations 24 and which radio stations 24 play which audio content 38 in which geographic regions 26. Accordingly, should a driver 40 indicate through a driver module 36 that he or she would like a recommendation, a recommendation module 34 may respond to such a request 52 with one or more recommendations 54 for radio stations 24 in the geographical region 26 currently occupied by the driver 40. The one or more recommendations 54 may be the radio stations 24 that may best match the preferences of the driver 40. In selected embodiments, a recommendation module 34 may obtain the recommendations 54 by comparing a driver model 48 corresponding to the driver 40 to other data contained within a recommendation model 50.

Figure 3:
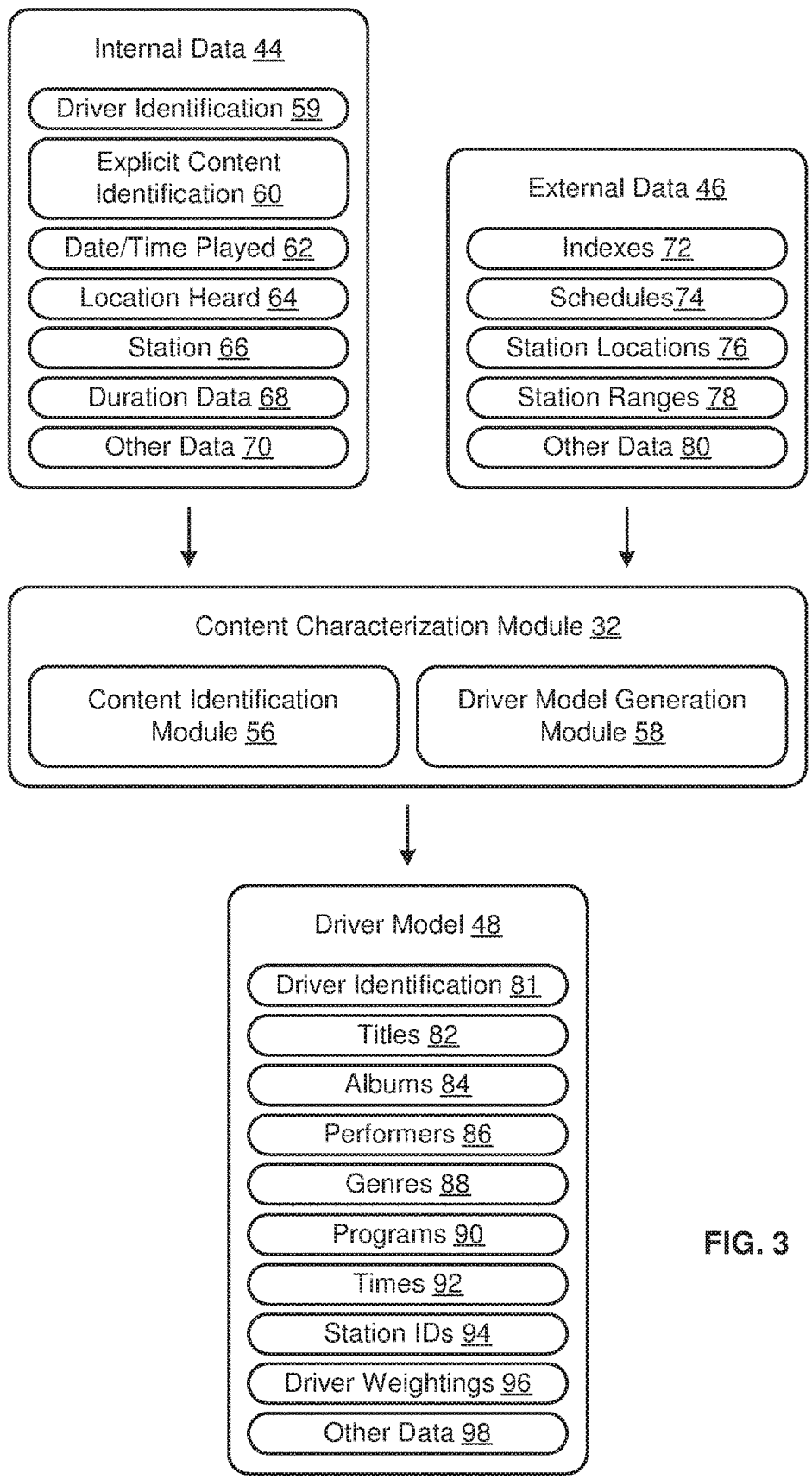
FIG. 3 is a schematic block diagram illustrating various aspects of one embodiment of the content-characterization module of FIG. 2.

Referring to FIG. 3, in selected embodiments, a content-characterization module 32 may comprise or include a content-identification module 56 and a driver-model-generation module 58. A content-identification module 56 may identify the audio content 38 listened to by one or more drivers 40. A content-identification module 56 may use internal data 44 or internal and external data 44, 46 to make the identification.

In selected embodiments or situations, internal data 44 may comprise or include an identification 59 of the driver 40 listening to the audio content 38, explicit content identification data 60, data 62 characterizing when selected audio content 38 was played or heard by a driver 40, data 64 characterizing where selected audio content 38 was played or heard by a driver 40, station identifications 66, data 68 characterizing how much time a driver 40 spend listening to selected stations 24 or audio content 38, other data 70, or the like or combinations or sub-combinations thereof.

In certain embodiments, an identification 59 of the driver 40 listening to the audio content 38 may be passed from a mobile device 22 to an infotainment system 20 of a corresponding vehicle 16. The identification 59 may be a unique (at least within a system 10) user name, number, or the like. Accordingly, so long as a driver 40 has his or her mobile device 22 on his or her person and a vehicle 16 has an appropriately equipped infotainment system 20, a driver 40 need not be driving his or her own vehicle 16 to benefit from a system 10 in accordance with the present invention. Thus, a driver 40 may benefit from a system 10 while he or she is driving a properly equipped rental car in an unfamiliar city.

The work performed by a content-identification module 56 may depend on the nature of the available data 44, 46. For example, in embodiments or situations where internal data 44 corresponding to a particular driver 40 comprises explicit content identification 60, a content-identification module 56 may not need to do much. Explicit content identification data 60 may include a title, album, performer, genre, or the like or combinations or sub-combinations thereof. Such data 60 may be available when a driver 40 is listening to satellite radio, audio content 38 stored on a flash driver, audio content 38 stored on a mobile device 22, or other situations where audio content 38 is typically closely coupled with data 60 identifying the audio content 38.

In selected embodiments, other data 70 may include destination data. For example, if a driver 40 has entered a destination into a navigational component of an in-vehicle computer system 14, that destination information may be used to predict potential interests of the driver 40. Such predictions may be factored into the recommendations 54 provided by a system 10.

In other embodiments, a content-identification module 56 may need more than internal data 44 to identify the audio content 38 listened to by a particular driver 40. For example, in one situation, internal data 44 may indicate that from 5:00 to 5:45 p.m. a particular driver 40 located in a first geographical region 26 listened to a first radio station 24 for 60% of the time and a second radio station 24 for 40% of the time. Alone, such data 44 may be insufficient to identify the audio content 38 heard by the driver 40. Accordingly, in such situations, a content-identification module 56 may access external data 46 to fill in the gaps.

External data 46 may be stored in a format where is may be readily accessed by a content-identification module 56. For example, external data 46 may be stored in one or more databases that may be queried by a content-identification module 56 as needed. In selected embodiments, external data 46 may include one or more indexes 72, one or more schedules 74, data 76 identifying the location of one or more radio stations 24, data 78 identifying the broadcast range of one or more radio stations 24, other data 80, or the like or combinations or sub-combinations thereof.

An index 72 may identify links among various pieces of information. For example, an index 72 may link a particular radio station 24 to a particular genre. Alternatively, or in addition thereto, an index 72 may link a particular song to a corresponding album, artist, group, genre, or the like. A schedule 74 may link certain audio content 38 to particular times of the day or week. For example, a schedule 74 may indicate which radio stations 24 play a particular syndicated program at which times. A schedule 74 may also take the form of a playlist identifying when particular audio content 38 (e.g., songs) will be played on a particular radio station 24.

External data 46 may be selectively combined with internal data 44 to identify the audio content 38 listened to by a driver 40. For example, as noted above, in one situation, internal data 44 may indicate that from 5:00 to 5:45 p.m. a particular driver 40 located in a first geographical region 26 listened to a first radio station 24 for 60% of the time and a second radio station 24 for 40% of the time. Accordingly, in that situation, a content-identification module 56 may use external data 46 to learn that the first station 24 is a sports radio station that plays a particular, nationally syndicated program on weekdays from 5:00 to 6:00 p.m. Similarly, the content-identification module 56 may use external data 46 to learn that the second station 24 plays country music. Accordingly, the content-identification module 56 may identify the audio content 38 preferred by the particular driver 40.

In selected embodiments, a content-identification module 56 may employ or leverage content recognition (e.g., music recognition) software, processes, or services to identify audio content 38. For example, in selected embodiments, internal data 44 may include one or more small portions or samples of the audio content 38. These samples may be directly analyzed to determine the identity of the corresponding audio content 38. For example, a sample may be compared to a various know audio files to see if a match can be determined. Accordingly, if a match is identified, the identity of the audio content 38 from which the sample was taken may be determined.

In certain embodiments, certain functionality associated with a content-characterization module 32 may be executed by an in-vehicle computer system 14. For example, in selected embodiments, a portion of a content-identification module 56 programmed to provide content recognition software, processes, or services, may be at least partially executed by an in-vehicle computer system 14. Such a content-identification module 56 or portion thereof may access a remote computer 12 via a communication network 18 for external data 46 or the like as necessary to support proper operation thereof.

A content-identification module 56 may identify audio content 38 at different levels of granularity. For example, in certain embodiments or situations, a content-identification module 56 may identify certain audio content 38 heard by a particular driver 40 at a relatively high or course level such as by genre (e.g., country music, classic rock, pop music, etc.). In other embodiments or situations, a content-identification module 56 may identify certain audio content 38 heard by a particular driver 40 on an intermediate level such as by artist, band, or the like. In still other embodiments or situations, a content-identification module 56 may identify certain audio content 38 heard by a particular driver 40 at a relatively detailed or fine level such as by song title, album, program name (e.g., "The Rush Limbaugh Show"), or the like. In selected embodiments, a content-identification module 56 may identify audio content 38 to the finest granularity supported by the data 44, 46.

A driver-model-generation module 58 may organize the content identifications output by a content-identification module 56 and any other necessary data 44, 46 to produce a driver model 48. A driver model 48 may characterize the listening preferences of a particular driver 40. Data presented or contained in a driver model 48 may include an identification 81 of the driver 40 whose listening preference are documented in the driver model 48, titles 82 of audio content 38, names of albums 84 in which the titles 82 are contained, performer names 86 (e.g., artists, bands, talk show hosts, or the like), genres 88, names of programs 90, times 92, stations 94, driver weightings 96, other data 98, or the like or combinations or sub-combinations thereof.

A driver-model-generation module 58 may organize the data of a driver model 48 in any suitable manner. In certain embodiments, the manner in which the data is organized may be selected to facilitate the identification of matches between the preferences of a driver 40 and the audio content 38 available in various geographic regions 26. In selected embodiments, a driver model 48 may comprise one or more tables showing how various pieces of data contained in the driver model 48 relate to one another.

For example, a driver model 48 may include a table relating titles 82, albums 84, performers 86, and genres 88. One possible row for such a table may include something like "Better Than I Used to Be" for the title 82, "Emotional Traffic" for the album 84, "Tim McGraw" for the performer 86, and "country" for the genre 88. Such a table may enable matching at any of these various levels of granularity.

Other tables may relate audio content 38 to driver weightings 96. Driver weightings 96 may provide an indication or measure of how strong of a preference a driver 40 may have to particular audio content 38. For example, a high percentage of the audio content 38 heard by a particular driver 40 may be from one or more albums corresponding to Taylor Swift. Accordingly, certain songs and albums corresponding to Swift, as well as the artist herself, may be weighted to reflect the preference of the driver 40.

Various weighting systems may be employed in a system 10 in accordance with the present invention. In selected embodiments, a system of driver weights 96 may be based on a running tally with respect to the last hundred pieces (or any other statistically significant sample size) of audio content 38 listened to by a driver 40. The driver weighting 96 applied may correspond or scale to how many separate pieces of audio content 38 of the one hundred are proportionally listened to by the driver 40.

For example, for a simplified case, it may be supposed that all of the last one hundred pieces of audio content 38 listened to by a driver 40 may be performances by Taylor Swift that were served from a mobile device 22 to an infotainment system 20. If that were the case, then the genre "pop" may be assigned a driver weight 96 of one hundred. Similarly, Swift the performer 86 may be assigned a driver weight 96 of one hundred. If sixty percent of the pieces of audio content 38 were songs of Swift's album entitled "1989," then that album 84 may be assigned a driver weight 96 of sixty. The remaining forty weighting "points" may be assigned to the other Swift albums 84 that were heard in proportion to how much they were heard. One hundred weighting points may also be divided among the various songs 82 in proportion to how much they were heard. Such driver weightings 96 may enable a driver model 48 to characterize or document the preferences of a corresponding driver 40 as various levels of granularity.

In selected embodiments, certain tables may relate audio content 38 to time 92. That is, certain drivers 40 may listen to different audio content 38 at different times of the day or week. For example, a particular driver 40 may typically listen to new programs during the time of the weekday morning commute, but pop music during the weekday evening commute. Accordingly, various times or "times zones" may be established and a driver model 48 may set forth different audio content 38 and driver weightings 96 and the like for the different time zones. In selected embodiments, different time zones may include weekend, weekday early morning and morning commute, weekday morning, weekday afternoon, Weekday early evening and evening commute, and weekday evening.

Figure 4:
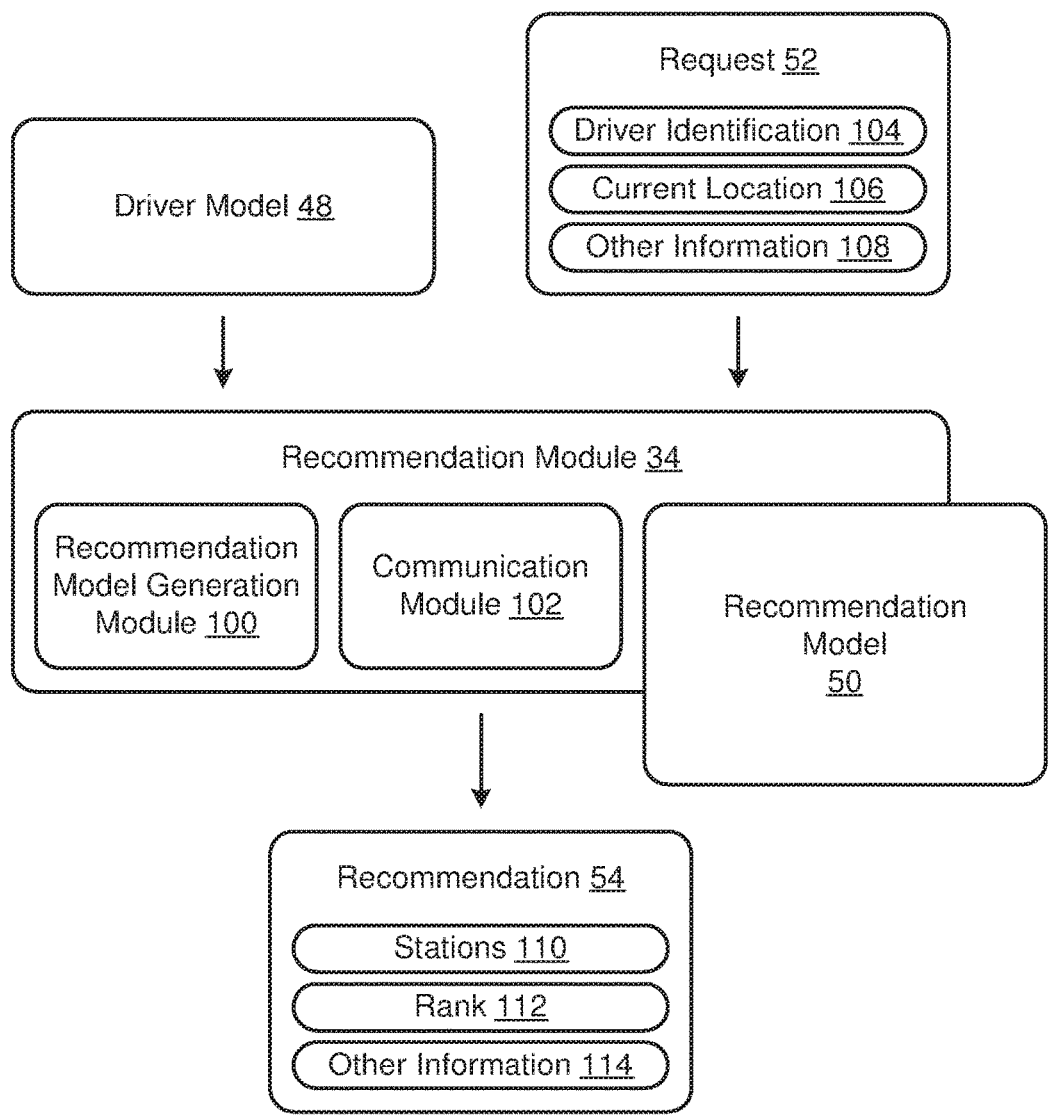
FIG. 4 is a schematic block diagram illustrating various aspects of one embodiment of the recommendation module of FIG. 2.

Referring to FIG. 4, in addition to characterizing the listening preferences of a particular driver 40, a driver model 48 may also provide a window or view into what audio content 38 is available on which radio stations 24 in which geographical regions 26 at which times. While such a window or view may be confined to the audio content 38 of interest to one driver 40, a compilation or aggregation of driver models 48 from dozens, hundreds, or thousands of drivers 40 in a particular geographic region 26 may provide an accurate view of what is available in that region 26.

Expanding this concept further, driver models 48 from dozens, hundreds, or thousands of drivers 40 in each geographic region 26 of a plurality of geographical regions 26 may provide an accurate view of what is available over a large geographic area (e.g., over an entire state or nation). Moreover, such a compilation or aggregation may indicate which stations 24 are more popular than others. For example, a collection of driver models 48 from a particular geographic region 26 may indicate that two radio stations 24 have similar audio content 38, but that one is more popular (i.e., listened to by more drivers 40) than the other. Such popularity data may be taken into account when making recommendations 54.

In selected embodiments, a recommendation module 34 may comprise a recommendation-model-generation module 100, a communication module 102, and a recommendation model 50. A recommendation-model-generation module 100 may compile or aggregate a plurality of driver models 48 to generate a recommendation model 50 covering a geographic region 26 or a plurality of geographic regions 26.

A recommendation-model-generation module 100 may organize and/or generate the data of a recommendation model 50 in any suitable manner. In certain embodiments, the manner in which the data is organized may be selected to facilitate the identification of matches between the preferences of a driver 40 and the audio content 38 available in various geographic regions 26. In selected embodiments, a recommendation model 50 may comprise a plurality of driver models 48. A recommendation model 50 may further comprise one or more tables relating the plurality of driver models 48 to one another or relating data extracted from the driver models 48.

For example, a recommendation model 50 may include one or more tables relating radio stations 24 (e.g., radio station IDs 94), titles 82, performers 84, genres 86, and station weightings. Such station weightings may provide an indication or measure of how often a radio station 24 plays particular audio content 38. For example, a significant percentage of the audio content 38 played by a particular radio station 24 may be in the genre 86 of pop music. Accordingly, the radio station 24 may be weighted to reflect the nature of the audio content 38 played by the radio station 24.

As noted above, various weighting systems may be employed in a system 10 in accordance with the present invention. In selected embodiments, a system of station weights used in a recommendation model 50 may correlate well to the driver weights 96 of the driver models 48. Accordingly, in certain embodiments, the station weights of a recommendation module 50 may be based on a running tally with respect to the last hundred pieces (or any other statistically significant sample size) of audio content 38 played by a radio station 24. The station weightings applied may correspond or scale to how many separate pieces of audio content 38 of the one hundred are proportionally played by the radio station 40.

For example, for a simplified case, it may be assuming that a radio station 24 plays only pop music. If that were the case, then the genre "pop" may be assigned a weight of one hundred. If five percent of the last one hundred pieces of audio content 38 were songs performed by Taylor Swift, Swift the performer 86 may be assigned a station weight of five. If songs from Swift's album entitled "1989" are played one percent of the time, then that album 84 may be assigned a station weight of one. The remaining ninety-nine station weighting "points" may be assigned to the other albums 84 that were played in proportion to how often they were played within the last one hundred pieces of audio content 38. One hundred weighting points may also be divided among the various songs 82 in proportion to how much they were played. Such station weightings may enable a recommendation model 50 to characterize or document the preferences of a corresponding radio station 24 as various levels of granularity.

In selected embodiments, certain tables of a recommendation model 50 may relate audio content 38 to the time 92 it is played on a radio station 24. That is, certain radio stations 24 may play different audio content 38 at different times of the day or week. For example, a particular radio station 24 may typically play news programs during the time of the weekday morning commute, but pop music the rest of the time. Accordingly, various times or "times zones" may be established and a recommendation model 50 may set forth different audio content 38 and station weightings and the like for the different time zones. In selected embodiments, different time zones for a recommendation model 50 may include weekend, weekday early morning and morning commute, weekday morning, weekday afternoon, weekday early evening and evening commute, and weekday evening.

Additionally, in certain embodiments, a recommendation-model-generation module 100 may use time data 92 to accurately characterize the audio content 38 played on the various radio stations 24. That is, different driver models 48 from different drivers 40 that happen to be driving in the same geographic region 26 may both report listening to particular audio content 38 on a particular station 24. Time data 92 (e.g., date and time of day) may be used to determine whether the particular audio content 38 was the same broadcast or a different broadcast. Accordingly, time data 92 may be used to avoid double counting the audio content 38 when multiple driver models 48 document the same broadcast.

A communication module 102 may receive a request 52 for recommendations, identify suitable recommendations 54, and return those recommendations 54 in response to the request 52. A request 52 in accordance with the present invention may comprise any necessary data. In selected embodiments, a request 102 may include an identification 104 of the driver 40 to whom the request 52 pertains, information 106 identifying the current location of the driver 40, other information 108 as desired or necessary, or the like or any combination or sub-combination thereof.

Information 104 identifying a driver 40 may enable a communication module 102 to determine which driver model 48 to use in a matching process. Information 106 identifying the current location of the driver 40 may enable a communication module 102 to determine which radio stations 24 are broadcasting in the geographic region 26 currently occupied by the driver 40.

A matching processes performed by a communication module 102 may be an effort to identify one or more radio stations 24 that play audio content 38 most like the audio content 38 preferred by a particular driver 40. In selected embodiments, a matching process may comprise the application of a mathematical algorithm to identify radio stations 24 with the strongest (e.g., highest or lowest depending on how a weighting scale is structured) station weights for audio content 38 that has the strongest driver weights 96 in the particular driver model 48.

For example, using the hypothetical examples set forth hereinabove, the radio station 24 that plays five percent Taylor Swift songs may be a best match to the driver module 48 documenting only Taylor Swift audio content 38. Both are fully directed to the genre of pop music and the radio station 24 may have the highest percentage of Taylor Swift audio content 38 in the geographic region 26 in which the corresponding driver 40 is currently located.

In other situations, a best match may be a more direct match of audio content 38. For example, a particular driver model 48 may show a strong preference for a particular, nationally syndicated talk show during the time of the morning commute. A request 52 from a driver 40 corresponding to that driver model 48 may be received by a recommendation module 34 during the time of the morning commute. The request 52 may indicate that the driver 40 is in an unfamiliar geographic region 26. Accordingly, a communication module 102 may use a recommendation model 50 to identify a radio station 24 that is in the unfamiliar geographic region 26 that plays the particular, nationally syndicated talk show during the time of the morning commute. That radio station 24 may then be recommended via a recommendation 54 sent to the driver 40.

A recommendation 54 in accordance with the present invention may comprise any necessary data. In selected embodiments, a recommendation 54 may include information 110 identifying one or more radio stations 24, information 112 setting forth an order or rank of the identified radio stations 24, other information 114 as desired or necessary, or the like or any combination or sub-combination thereof. The order or rank of the identified radio stations 24 may communicate how the radio stations 24 may relate to one another in terms of a predicted relevance to a corresponding driver 40.

Figure 5:
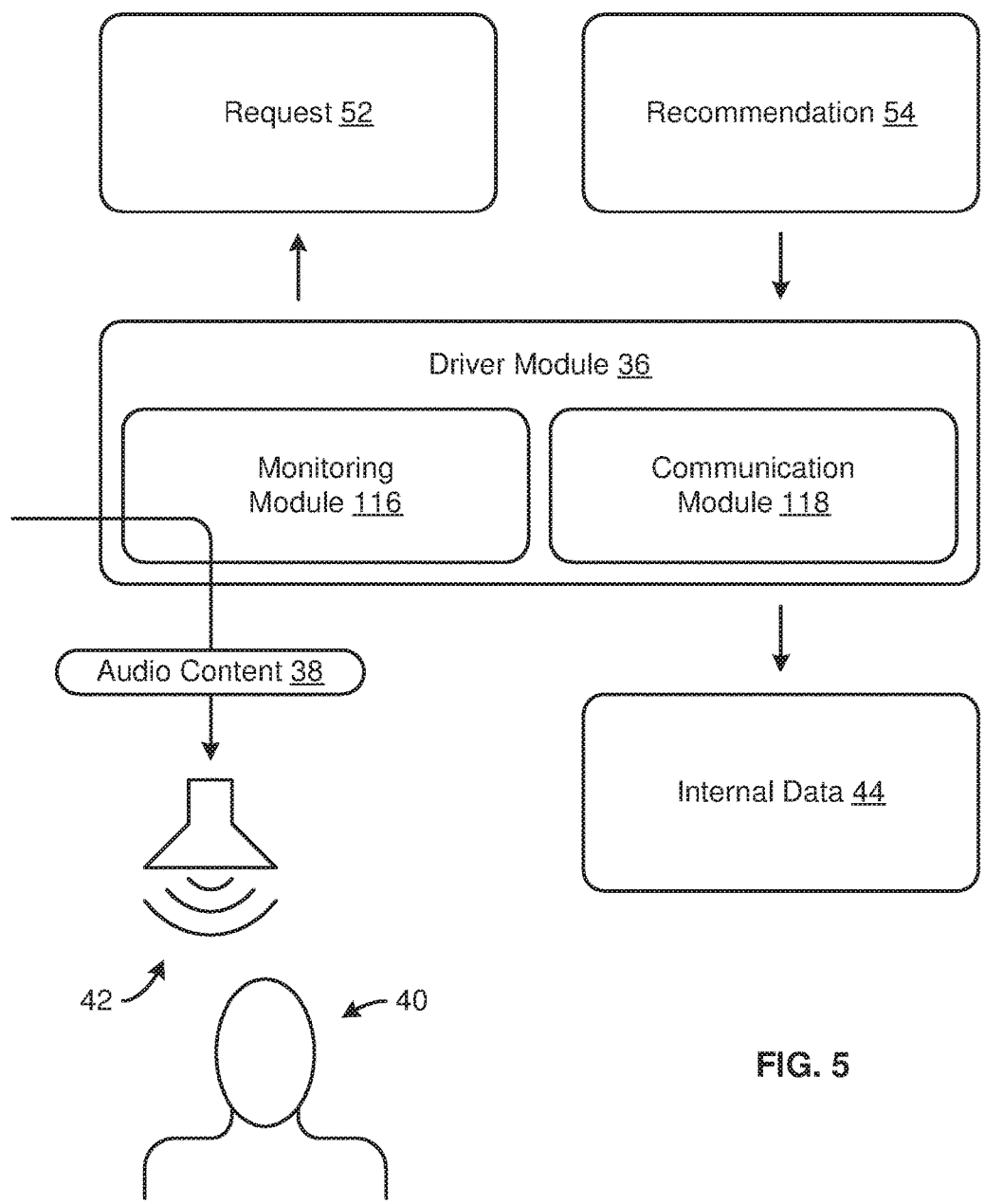
FIG. 5 is a schematic block diagram illustrating various aspects of one embodiment of the driver module of FIG. 2.

Referring to FIG. 5, in selected embodiments, a driver module 36 may include a monitoring module 116 and a communication module 118. A monitoring module 116 may monitor the audio content 38 that is being heard by a driver 40. For example, a monitoring module 116 may monitor audio content 38 that is played over the speakers 42 of an infotainment system 14. Based on this monitoring, a monitoring module 116 may collect or compile internal data 44.

A communication module 118 may assist in sending internal data 44 from a driver module 36 to a content-characterization module 32. A communication module 118 may send the internal data 44 at any suitable time. In selected embodiments, a communication module 118 may send internal data 44 in periodic packages separated by significant periods of time rather than in a continuous or semi-continuous stream.

In certain embodiments, a communication module 118 may send out requests 52 and receive and implement recommendations 54. A communication module 118 may generate a request 52 in any suitable manner. In selected embodiments, the command to initiate one or more requests 52 may originate with a driver 40. For example, a driver 40 may instruct a communication module 118 to recommend radio stations 24. In such embodiments, the recommendations 54 may only be obtained from a recommendation module 34 after a corresponding command is initiated by the driver 40

Alternatively, a communication module 118 may initiate one or more requests 52. For example, a communication module 118 may periodically send a request 52 for recommendations 54. When the recommendations 54 are provided, they may stored by a communication module 118. Accordingly, should a driver 40 like to sample one or more of the recommended radio stations 24, he or she may simple instruct the communication model to 118 tune a radio of an infotainment system 20 to one or the recommended radio stations 24.

Figure 6:
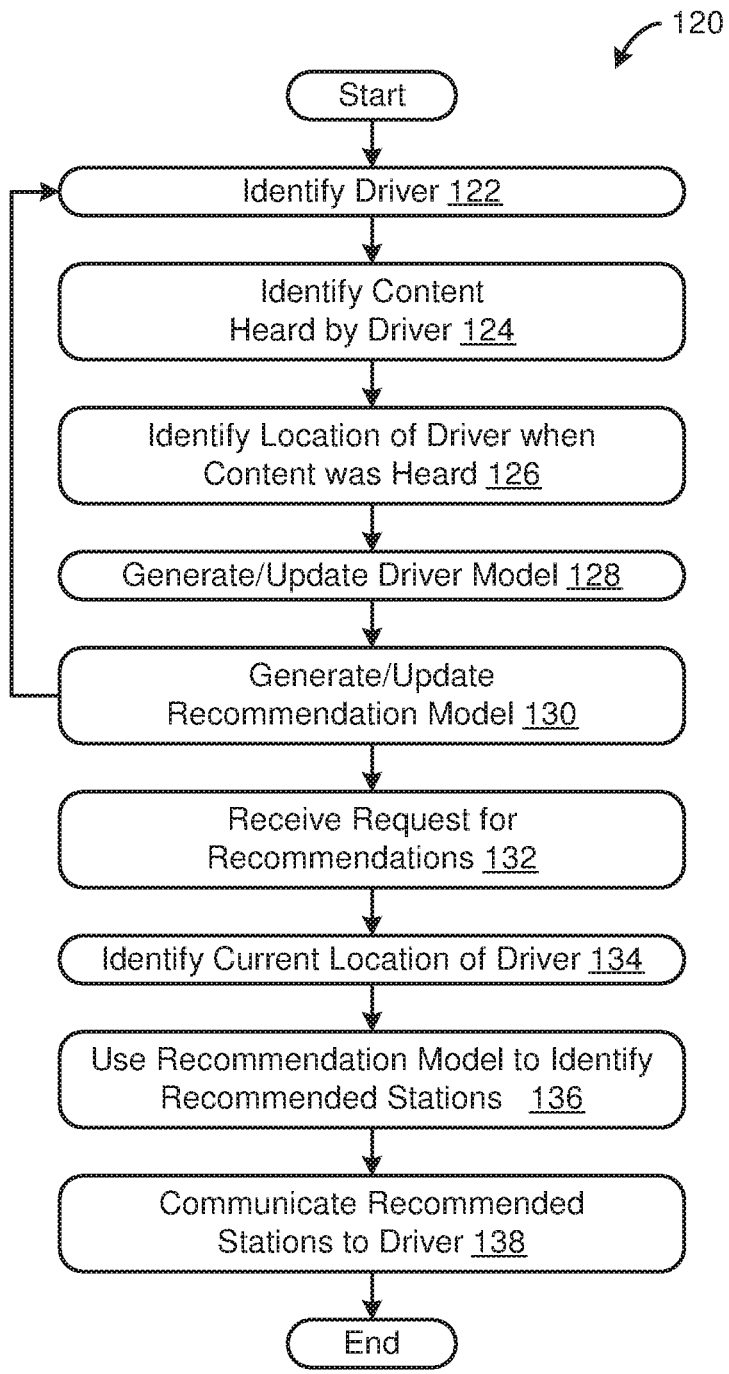
FIG. 6 is a schematic block diagram of one embodiment of a method corresponding to or executed by a recommendation system in accordance with the present invention.

Referring to FIG. 6, a system 10 may support, enable, or execute a process 120 in accordance with the present invention. In selected embodiments, such a process 120 may begin with identifying 122 a driver 40, identifying 124 audio content 38 heard to by the driver 40, and identifying 126 the location of the driver 40 during the time the audio content 38 was being heard. A driver model 48 may then be generated 128 (or updated 128 if a driver model 48 for the particular driver 40 is already extant). A recommendation model 50 may also be generated 130 (or updated 130 if a recommendation model 48 for the particular geographic region 26 is already extant).

These initial steps 122, 124, 126, 128, 130 may be repeated multiple times for each driver 40 of a plurality of drivers 40. Over time and with enough drivers 40 participating, a recommendation model 50 may be fully fleshed out. That is, the recommendation model may be built out and updated 130 sufficiently to accurately depict what audio content 38 is available from which radio stations 24 within a large geographic area covering multiple geographic regions 26.

With the recommendation model 50 built out, a request 52 may be received 132 to provide one or more recommendations 54. Accordingly, a current location of a driver corresponding to the request 52 may be identified 134 and a recommendation model 50 may be used 136 to identify one or more recommended stations 110. If the driver 40 is located in his or her base geographic region 26a, the recommendations 110 may correspond to other or new radio stations 24a in that region 26a. Alternatively, if the driver 40 is located outside of his or her base geographic region 26a, the recommendations 110 may correspond to radio stations 24b in another region 26b. Thereafter, the one or more recommended radio stations 110 may be communicated 138 to the corresponding driver 40.

The flowcharts in FIGS. 2 and 6 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   generating, by a computer system, multiple models corresponding to multiple drivers such that each model of the multiple models documents content heard by a different driver of the multiple drivers;
   aggregating, by the computer system, the multiple models to form a recommendation model that identifies which radio stations play which audio content in which geographic regions;
   receiving, by the computer system from a first driver of the multiple drivers, a request for recommendations;
   leveraging, by the computer system in response to the receiving, the recommendation model to identify at least one radio station that presents content best matching content documented within a first model of the multiple models that corresponds to the first driver; and responding, by the computer system, to the request with the at least one radio station.

2. The method of claim 1, wherein:
the first driver has a base geographic region in which the first driver primarily drives; and
the receiving comprises receiving, by the computer system, the request from the first driver while the first driver is located outside of the base geographical region.

3. The method of claim 2, wherein the computer system comprises:
an infotainment system installed in a vehicle driven by the first driver; and
at least one remote computer connected via a communication network to the infotainment system.

4. The method of claim 3, wherein the generating comprises:
monitoring, by the infotainment system, the content listened to by the first driver while driving the vehicle; and
reporting, by the infotainment system to the at least one network computer, information characterizing the content listened to by the first driver while driving the vehicle.

5. The method of claim 4, wherein the content listened to by the first driver while driving the vehicle comprises local radio programming played through the infotainment system of the vehicle.

6. The method of claim 5, wherein the content listened to by the first driver while driving the vehicle comprises content played from a mobile device through the infotainment system of the vehicle.

7. The method of claim 6, wherein the content listened to by the first driver while driving the vehicle comprises satellite radio programming played through the infotainment system of the vehicle.

8. A method comprising:
generating, by a computer system, a plurality of driver models, wherein at least one driver model of the plurality of driver models corresponds to each driver of a plurality of vehicle drivers and documents audio content listened to by the each driver while driving;
aggregating, by a component of the computer system, the plurality of driver models to generate a recommendation model correlating radio stations, audio content, and geographic regions;
the aggregating wherein the component is located remotely with respect to each driver of the plurality of vehicle drivers;
receiving, by the computer system from a first driver of the plurality of drivers while the first driver is in a first geographic region of the geographic regions, a request for recommendations;
comparing, by the computer system, a first driver model of the plurality of driver models with other data contained within the recommendation model, the first driver model corresponding to the first driver;
identifying, by the computer system based on the comparing, at least one radio station of the radio stations, wherein the at least one radio station presents audio content within the first geographic region that best matches the audio content documented within the first driver model; and
recommending, by the computer system, the at least one radio station to the first driver.

9. The method of claim 8, wherein the each driver of the plurality of vehicle drivers drives most often in a base geographical region corresponding to the each driver.

10. The method of claim 9, wherein the at least one driver model documents audio content listened to by the each driver while driving in the base geographic region corresponding to the each driver.

11. The method of claim 10, wherein the first geographic region is different than the base geographic region corresponding to the first driver.

12. The method of claim 11, wherein the first geographic region is the base geographic region corresponding to a second driver of the plurality of vehicle drivers.

13. The method of claim 12, wherein the recommendation model identifies which radio stations play which audio content in which geographic regions.

14. The method of claim 13, wherein the recommendation model further identifies which radio stations play which audio content in which geographic regions at which times of the day.

15. The method of claim 8, wherein the audio content documented in the generating comprises content played from a mobile device through an infotainment system of a vehicle.

16. The method of claim 8, wherein the audio content documented in the generating comprises satellite radio programming played through an infotainment system of a vehicle.

17. The method of claim 8, wherein the audio content documented in the generating comprises local radio programming played through an infotainment system of a vehicle.

18. The method of claim 8, wherein the computer system comprises:
an infotainment system installed in a vehicle driven by the first driver; and
at least one remote computer connected via a communication network to the infotainment system.

19. The method of claim 18, wherein the generating comprises:
monitoring, by the infotainment system, the audio content listened to by the first driver while driving; and
reporting, by the infotainment system to the at least one network computer, information characterizing the audio content listened to by the first driver while driving.

* * * * *